UNITED STATES PATENT OFFICE.

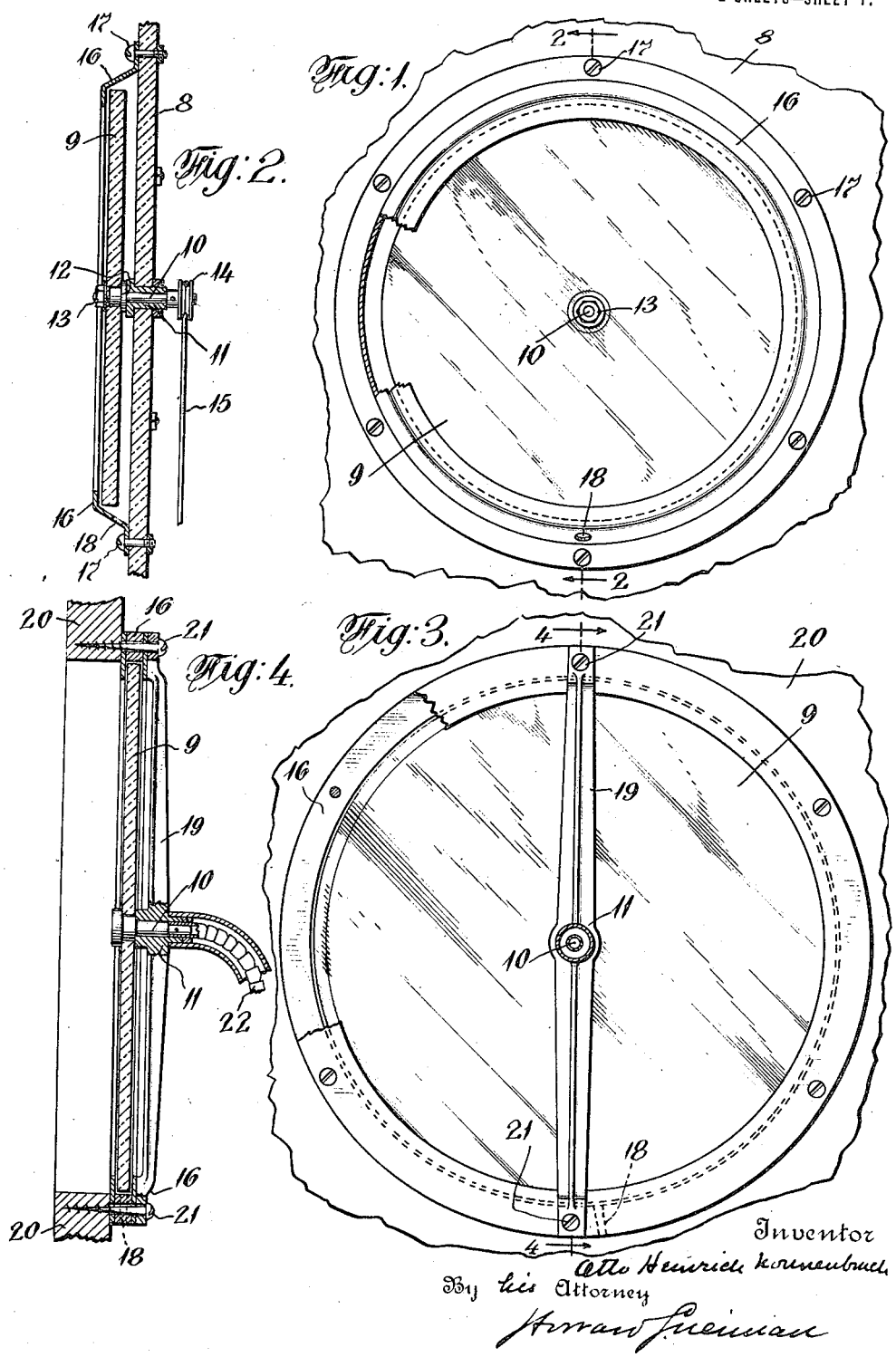

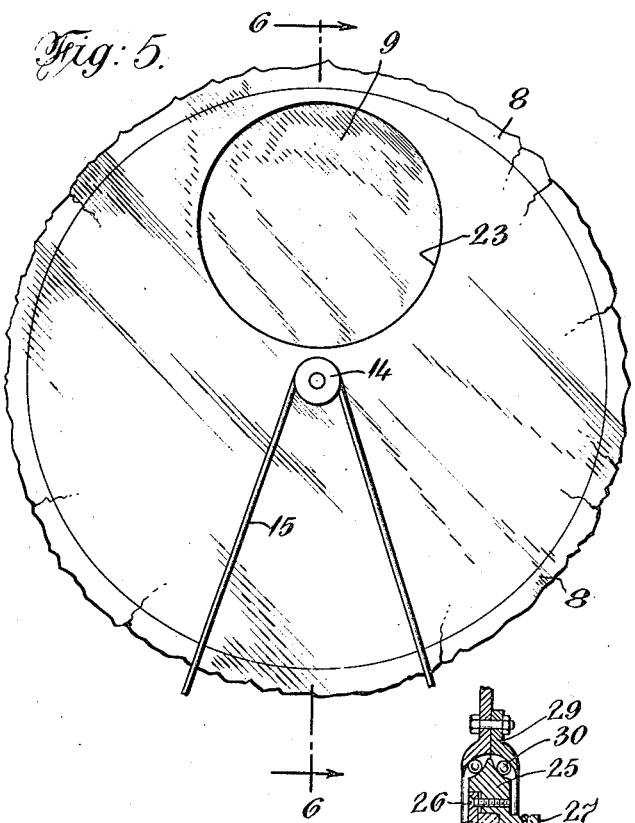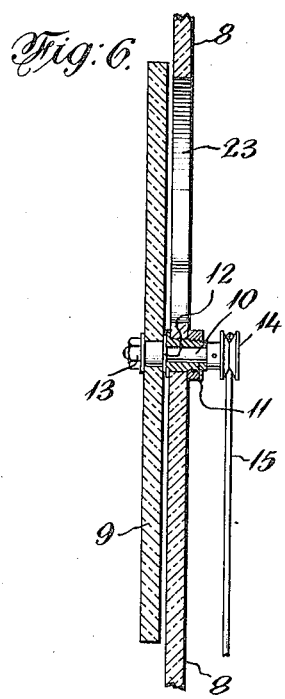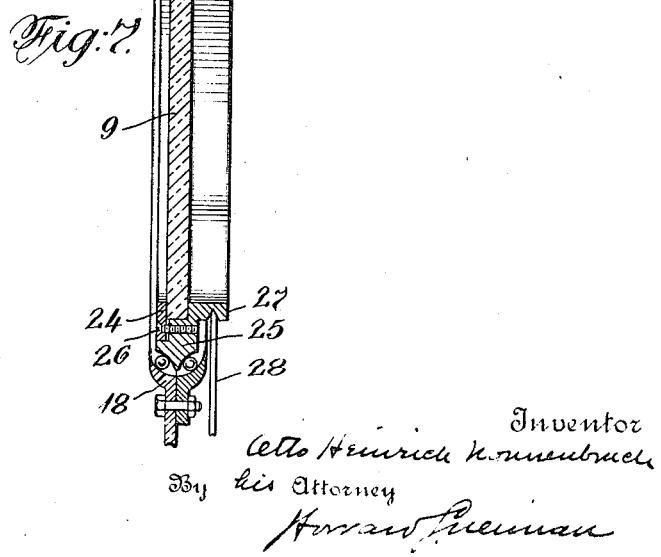

OTTO HEINRICH NONNENBRUCH, OF NEW ROCHELLE, NEW YORK.

DEVICE FOR MAINTAINING THE TRANSPARENCY OF TRANSPARENT MEDIUMS.

1,195,256. Specification of Letters Patent. Patented Aug. 22, 1916.

Application filed October 6, 1915. Serial No. 54,354.

*To all whom it may concern:*

Be it known that I, OTTO HEINRICH NONNENBRUCH, a citizen of Germany, and a resident of New Rochelle, in the county of Westchester and State of New York, have invented certain new and useful Improvements in Devices for Maintaining the Transparency of Transparent Mediums, of which the following is a specification.

My invention relates to a means for eliminating moisture, snow, &c., from a transparent medium and refers particularly to a device whereby the outlook through a glass window is not interfered with by atmospheric agencies.

One object of my invention is an inexpensive and effective means for preserving the transparency of glass during the influence of fogs, rains, snows and similar atmospheric elements.

Another object of my invention is a means whereby water may be eliminated from, and prevented from being deposited upon, a transparent medium.

Another object of my invention is a means for maintaining a clear view through a transparent medium, irrespective of the atmospheric conditions.

Other objects of my invention are evident from a consideration of my specification and claim.

The difficulties incident to keeping lookout windows of locomotives, and cars and wind shields of automobiles, free from accumulated moisture, snow, and ice are well known and many attempts have been made to accomplish perfect transparency of these mediums, and to remove the accumulated particles.

My device presents an effective means for accomplishing this in a cheap and automatic manner, the subject of my invention not requiring personal attention of the engineer or motor-man.

In a broad way, my invention comprises a sheet of transparent material revolving sufficiently rapidly to throw off and thus eliminate particles of water, snow, ice and similar matter.

In the accompanying drawings, which form a part of this specification, illustrating several modifications of my invention, similar parts are designated by similar numerals.

Figure 1 is a front plan view of one form of my invention, partly broken away. Fig. 2 is a cross-sectional view through the line 2—2 of Fig. 1. Fig. 3 is a front plan view of a modification of my invention, partly broken away. Fig. 4 is a cross-sectional view through the line 4—4 of Fig. 3. Fig. 5 is a front plan view of a modification of my invention. Fig. 6 is a cross-sectional view through the line 6—6 of Fig. 5. Fig. 7 is a cross-sectional view of another form of my invention.

In Figs. 1 and 2, 8 is a sheet or plate of glass, such as a window, supported in a frame in the usual way, not shown in the drawing. 9 is a circular transparent glass disk revolubly supported by means of the shaft 10 extending through a bearing 11 in a hole in the glass plate 8. The shaft 10 carries a fixed collar 12, against which the disk 9 is held in abutment by means of the threaded nut 13. The other end of the shaft 10 carries a pulley wheel 14, the wheel 14, shaft 10 and disk 9 being caused to revolve by movement of the belt or cord 15 connected with a means of power not shown. Surrounding the disk 9 is a protective ring 16, fastened to the glass plate 8 by the bolts 17, 17, the protective ring 16 being extended downwardly and outwardly from the glass plate 8, so as to extend over the edge of the disk 9, preventing moisture from finding its way downwardly along the upper surface of the glass plate 8 and between the glass plate 8 and the disk 9. The protective ring 16 has a hole 18 at the bottom thereof, in order to allow any accumulated water to escape. In operation the transparent disk 9 is caused to be revolved rapidly by means of power transmitted through the rope 15 to the pulley wheel 14, the rotation of the disk causing any impinging water, rain, snow or other particles to be thrown off by centrifugal force and thus eliminated, while the protective ring 16 prevents any moisture from entering between the glass plate 8 and the revolving disk 9. As the glass plate 8 is protected from the atmospheric elements it will remain clear, while the disk 9 will remain clear through its rotation and hence a clear vision may be constantly maintained.

In Figs. 3 and 4, the revoluble transparent disk 9 is maintained in a plane of revolution by means of the supporting member 19, which is shown as being supported at its outer ends to the window frame 20, by means of the screws 21, 21. The revoluble disk 9 is fixedly attached to the shaft 10 which is revolubly mounted in the bearing 11 and held free from horizontal movement therein. A protective ring 16 surrounds the disk 9 and carries a channel upon its inner surface, in which the disk 9 revolves, the ring having a hole 18 at its lower part. Attached to one end of the shaft 10 is a flexible revolving shaft 22 connected with a suitable means of power. It is evident that instead of fastening the supporting member 19 to the window frame 20 as shown in the drawings, it may be attached to a sheet or plate of glass, as a window, by suitable means, the disk 9 being in that event of smaller size than the window glass to which it is attached.

In Figs. 5 and 6, the sheet or plate of glass 8, has a hole 23, in front of which is the revoluble transparent disk 9, of such a size that the hole 23 is completely covered thereby. No protecting ring is shown in these drawings but it is evident that one may be attached as in Figs. 1, 2, 3 and 4 if desired.

In Fig. 7, the revoluble transparent disk 9 is surrounded by and fixedly attached to a frame composed of the parts 24 and 25 held together by the threaded screw 26, the part 25 being extended and grooved to form the pulley wheel 27, which is revolved by the rope 28. The disk 9 and its frame are revoluble within the circular supporting frame 29, means being applied to the disk frame and the supporting frame to allow of the introduction and retention of ball bearings 30. In operation the transparent disk 9 and its frame 24, 25, 27 are rapidly revolved by means of the rope drive 28, within the supporting frame 29, eliminating all moisture, &c., by centrifugal force.

I do not limit myself to the size, number, shape or arrangement of parts as shown and described, all of which may be varied without going beyond the scope of my invention as described and claimed.

What is claimed, is:

The process of preserving the transparency of a vision shield which consists in rotating the transparent shield in its own plane with sufficient speed to prevent by centrifugal force the accumulation thereon of impinging particles.

Signed at Shreveport, in the parish of Caddo and State of Louisiana, this 29th day of September, 1915.

OTTO HEINRICH NONNENBRUCH.